United States Patent
Sauterey et al.

(10) Patent No.: US 6,756,456 B2
(45) Date of Patent: Jun. 29, 2004

(54) ADHESIVE LATEX BASED ON CARBOXYL-FUNCTIONALIZED POLYCHLOROPRENE WITH LOW WATER RETENTION

(75) Inventors: François Sauterey, Champ sur Drac (FR); Françoise Thenoz, Caluire (FR); Alain Guyot, Lyons (FR); Romano Lima, Godo (IT); Piero Maestri, Forlimpopoli (IT); Francesco Masi, Saint'Angelo Lodigiano (IT)

(73) Assignees: Enichem Elastomeres France S.A., Le Pont de Claix (FR); Polimeri Europa S.p.A., Brindisi (IT)

( * ) Notice: Subject to any disclaimer, the term of this patent is extended or adjusted under 35 U.S.C. 154(b) by 63 days.

(21) Appl. No.: 10/143,981

(22) Filed: May 14, 2002

(65) Prior Publication Data

US 2003/0083430 A1 May 1, 2003

(30) Foreign Application Priority Data

May 14, 2001 (FR) .............................. 01 06325

(51) Int. Cl.[7] .............................. C08F 2/16; C08F 2/26; C08F 36/16; C08F 36/18
(52) U.S. Cl. ................. 526/216; 526/291; 526/318
(58) Field of Search ................. 526/216, 291, 526/318

(56) References Cited

U.S. PATENT DOCUMENTS 5,306,793 A     4/1994  Parker, III et al.

FOREIGN PATENT DOCUMENTS

DE     25 35 169     2/1976
DE     36 43 792     6/1988

*Primary Examiner*—Kelechi C. Egwim
(74) *Attorney, Agent, or Firm*—Oblon, Spivak, McClelland, Maier & Neustadt, P.C.

(57) ABSTRACT

A process for the polymerization of chloroprene or of a mixture of chloroprene and of up to 20% by weight of a copolymerizable monomer, in aqueous emulsion in the presence of radical initiators, at a temperature of between 5° C. and 70° C., characterized in that the polymerization is carried out in the presence of one or more copolymerizable surfactants in agreement with the formula described below (I)

$$R^3-Z-CO-C(R^1)=C(R^2)-COOM \qquad (I)$$

where:
- $R^3$ is a saturated or unsaturated, linear or branched and aliphatic or aromatic $C_n$ hydrocarbonaceous chain with n from 10 to 20;
- $R^1$ and $R^2$, which are identical or different, are chosen from H or a $C_1$-$C_3$ alkyl radical;
- Z is chosen from —O— and —NH—;
- M is chosen from alkali metals or $NH_4$.

11 Claims, No Drawings

ADHESIVE LATEX BASED ON CARBOXYL-FUNCTIONALIZED POLYCHLOROPRENE WITH LOW WATER RETENTION

DESCRIPTION

A subject-matter of the present invention is a process for the polymerization of chloroprene, the polychloroprenes obtained by the process and their use, in particular in adhesive mixtures.

More specifically, a subject-matter of the invention is a process for the polymerization of chloroprene in aqueous emulsion in the presence of copolymerizable surfactants, so that all or a large portion of the copolymerizable surfactant is found attached to the polymer chain.

In numerous fields of application, for ecological, health and safety reasons, there is a call for solvent adhesives to be substituted by aqueous adhesives.

Among its various uses, chloroprene rubber is sold for preparing solvent adhesives.

Numerous patents consequently disclose the means of obtaining latices of copolymerized or noncopolymerized polychloroprene in the form of an aqueous emulsion or an aqueous suspension in order to meet such a need.

Adhesive latices based on polychloroprene (CR) have to exhibit two main characteristics, which are good adhesiveness on numerous supports and rapid development of the cohesive forces of the film, obtained by a rapid rate of crystallization of the polymer.

The adhesive performance, measured starting from CR adhesive latices, in particular on nonporous supports, is poorer than that obtained with CR solvent adhesives.

The conventional formulation of an emulsion polymerization involves, inter alia, one or more amphiphilic compounds, known as "surfactants", which make it possible simultaneously to stabilize the polymer particles and to control their size. These surfactant molecules are distributed between the surface of the polymer particles and the dispersing medium according to a complex adsorption/desorption equilibrium and can desorb under certain constraints. In the case of a film-forming polymer, such as CR, the consequences of this desorption phenomenon can be harmful. This is because some writers (Guyot A. and Tauer K., Advances in Polymer Science, 111, 43–45, 1994) have suggested that the surfactant thus desorbed is capable of migrating to the surface of the film, thus leading to the formation of hydrophilic domains. These regions of weakness are capable of detrimentally affecting the properties of the film, in particular its resistance to moisture, an important characteristic in the field of footwear, and thus its long term strength.

The industrial polymerization of chloroprene makes use, as stabilizers, of rosin salts. Simply adsorbed at the surface of the polymer particles, rosin salts have a tendency, during film formation, to group together in the form of domains, thus creating regions with a hydrophilic nature. It then becomes difficult to remove the water in a short time, which greatly reduces the advantage of adhesives of this type, in comparison with other adhesive latices, such as polyurethane-based latices.

One of the means for countering these disadvantages is to incorporate a surfactant which is copolymerizable with the CP, which surfactant will be found bonded to the polymer particles via a covalent chemical bond. It can therefore neither desorb from the surface of the polymer particles nor form hydrophilic regions during the film formation of the latex. This makes it possible to facilitate pathways for water to the surface of the adhesive film, thus reducing the drying time.

This alternative furthermore exhibits the advantage of making possible, during the destabilization of the latex for the purpose of using it as dry rubber, facilitated recycling of the aqueous wash liquor and reduced contamination by water.

The object of this present invention is to emulsion polymerize chloroprene, in the presence or absence of other comonomers, in the presence of a copolymerizable surfactant, in combination or not in combination with other known surfactants, so that all or a large portion of the copolymerizable surfactant is found attached via covalent bonds to the polymer chain.

The copolymerizable surfactant is, on its own, both a generator of micelles, because of its surfactant properties, and a comonomer, this being the situation within a wide pH and temperature range.

The copolymerizable surfactants are also known as reactive surfactants or surfmers (contraction of "surfactant monomer"), as they have a functional group capable of taking part in the propagation stage in the same way as the main monomer.

It is difficult to find, for a defined monomer, a surfactant capable of simultaneously acting as micelle generator (true surfactant) and as comonomer.

It is even surprising to find a micelle-generating copolymerizable surfactant which can, on its own, provide for the polymerization, without inhibiting it, and give rise to a stable latex.

This is because conventional copolymerizable surfactants known to date, such as reactive carboxylic acids, sodium styrenesulphonate and other products, only act as surfactants once copolymerized.

The reactive surfactants described in the literature include, inter alia, surfactants comprising reactive functional groups of acrylic or methacrylic type, but the latter do not make it possible, on their own, to form stable latices (Schoonbrood H. A.S. et al., Journal of Applied Polymer Science, 66, 1803–1820, 1997). This can be explained either by their high reactivity, leading to a high level of embedding, or by their affinity for the aqueous phase and the formation of polyelectrolytes. Whatever the true reason for it, the use of such surfactants does not make possible the preparation of stable latices, the polymer particles then being found to be without a significant fraction of the stabilizing carboxylic charges introduced by the surfactant.

Furthermore, it is difficult to find a surfactant which is copolymerizable with CP, given the high reactivity of chloroprene and its marked tendency towards homopolymerization.

The use of a sulphonated maleic surfactant, derived from sulphonated rosin or from a sulphonated fatty acid and synthesized according to a complex three-stage protocol, is disclosed in the Westvaco Patent U.S. Pat. No. 5,306,793, without an applicational example for chloroprene. This copolymerizable surfactant cannot be used alone and requires the parallel use of one or more conventional surfactants. Furthermore, the presence of sulphonate groups hinders the destabilization of the latex by the cold, which compromises the use of the polymer in the dry rubber form.

In its U.S. Pat. No. 4,446,282, Goodyear (U.S.) discloses the use of hemiesters and of hemiamides of certain dicarboxylic acids, such as 2-ethyl-1-hexyl maleic acid ester (EHMAE), but at basic pH and solely as comonomers, in combination with one or more true surfactants, for the sole purpose of preparing dry rubbers carrying carboxyl functional groups. Goodyear does not disclose the preparation of latex as such and gives no example of the polymerization of chloroprene.

In its patent EP 0 495 365, Bayer discloses a semi-continuous process which makes possible a homogeneous distribution of the carboxyl functional groups at the surface of the polymer particles, via the copolymerization of a non-surface-active acid comonomer. In comparison with a batch process, this process suffers, however, from complex processing.

The Applicant Company claims a process for the polymerization of chloroprene or of a mixture of chloroprene and of up to 20% by weight of a copolymerizable monomer, in aqueous emulsion in the presence of radical initiators, at a temperature of between 5° C. and 70° C., characterized in that the polymerization is carried out in the presence of one or more copolymerizable surfactants in agreement with the formula described below (I)

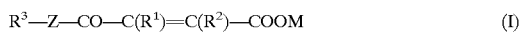

where: $R^3$ is a saturated or unsaturated, linear or branched and aliphatic or aromatic $C_n$ hydrocarbonaceous chain with n from 10 to 20;

$R^1$ and $R^2$, which are identical or different, are chosen from H or a $C_1$-$C_3$ alkyl radical;

Z is chosen from —O— and —NH—;

M is chosen from alkali metals or $NH_4$;

$R^3$ is preferably chosen from $C_{12}$ to $C_{18}$ alkyl radicals., Preferably $R^1$=$R^2$=H., M is preferably chosen from Na and K.

This product of formula (I) can be prepared by a simple chemical reaction, such as the reaction between a fatty alcohol and maleic anhydride or between a fatty amine. and maleic anhydride.

The Applicant Company claims the moderate reactivity (Schoonbrood H. A.S. et al., Journal of Applied Polymer Science, 66, 1803-1820, 1997) and the absence of homopolymerization reactions (Tauer K. et al., Makromol. Chem., Macromol. Symp., 31, 107-121, 1990) of the reactive surfactants described above. This characteristic allows them to react with chloroprene, alone or in combination with other comonomers, preferably at the end of the reaction, for a high overall conversion of the main monomers. This limits the loss of the stabilizing carboxyl functional groups, whether by embedding or homopolymerization reaction, and thus makes it possible to suitably stabilize the latices, without it being necessary to resort to a cosurfactant.

The Applicant company claims the homo- or the copolymerization of chloroprene in the presence of only the "reactive" surfactants defined above, within the polymerization temperature range from 5 to 70° C., within a pH range from 5 to 13, preferably between 6 and 8, that is to say allowing the polymerization of acid or easily hydrolysable comonomers, such as (meth)acrylic acids and alkyl (meth) acrylates.

The amount of the "reactive" surfactants according to the formula (I) is from 2 millimol to 50 millimol, preferably from 5 millimol to 20 millimol, per 100 grams of chloroprene or of the mixture of chloroprene and of the copolymerizable monomers.

The polymerizable process according to the invention is carried out in a known way in aqueous emulsion in the presence of free radical generators, such as aqueous hydrogen peroxide solution, organic peroxides, cumyl peroxide, dibenzoyl peroxide, alkali metal ferricyanides, ammonium ferricyanide and, preferably, alkali metal persulphates or ammonium persulphate.

The chloroprene can be replaced by up to 20% of its weight of another copolymerizable monomer. Mention may be made, among the monomers which are copolymerizable with chloroprene, of vinylaromatic compounds, such as styrene, vinyltoluenes and vinylnaphthalenes, acrylic acids, methacrylic acids and their ester and nitrile derivatives, such as ethyl acrylate, butadiene, isoprene, 2,3-dichloro-1,3-butadiene and 2,3-dimethyl-1,3-butadiene, and vinyl ethers and ketones, such as methyl vinyl ether, vinyl acetate and methyl vinyl ketone.

The concentration of the monomer or monomers in the emulsion is generally between 30 and 60% by weight with respect to the total weight of the emulsion.

The final degree of conversion can vary from 50% to 100% and preferably from 70% to 95%.

The polymerization can be stopped at any time by addition of a conventional polymerization-inhibiting agent. The residual monomer is removed by flash distillation.

The carboxyl functional groups present at the surface of the polymer particles of the latex are between 3 meq/100 grams and 30 meq/100 grams, preferably between 5 meq/100 grams and 15 meq/100 grams, of polymer.

The use of a reactive surfactant as claimed makes it possible, in comparison with the use of conventional surfactants generally used for the emulsion polymerization of chloroprene, to reduce the water uptake of the latex films by a factor of 4 (Example 1C and 2C).

It is probable that these properties result from a high level of incorporation of the reactive surfactant in the polymer macromolecules (Example 1D).

Moreover, the use of a reactive surfactant as claimed makes it possible to functionalize the polymer particles, preferably at the surface, without having recourse to a semi-continuous addition process for the monomers and contrary to the use of an acrylic comonomer in a batch process (Examples 1E and 2E).

Finally, the use of a reactive surfactant as claimed makes it possible to limit the negative influence of the copolymerization on the crystalline properties of the final material (Examples 1F to 4F).

Example 1A

A chloroprene homopolymer latex is obtained by polymerization, at 50° C. and under an inert nitrogen atmosphere, of 100 parts by mass of chloroprene, 0.23 part by mass of n-dodecyl mercaptan, 0.0097 mol of hemiester reactive surfactant HEC12 ($R_1$=$R_2$=H, Z=O, M=Na, n=12) per 100 g of monomer, one molar equivalent of sodium hydroxide and 90 parts by mass of deaerated soft water. The polymerization is initiated by continuously delivering a redox system composed of 1% sodium persulphate and of 1% sodium dithionite. The polymerization is halted at approximately 75% conversion by addition of 0.05 part by mass of phenothazine.

Examples 2A to 6A

A chloroprene homopolymer latex is prepared as described in Example 1A, except that the nature of the reactive emulsifier used is varied while maintaining the number of moles of the latter identical over all the tests, i.e. equal to 0.0097 mol per 100 g of chloroprene charged.

The reactive emulsifier of Example 2A is HEC16 ($R_1$=$R_2$=H, Z=O, M=Na, n=16).

The reactive emulsifier of Example 3A is HA12 ($R_1$=$R_2$=H, Z=NH, M=Na, n=12).

The reactive emulsifier of Example 4A is HA16 ($R_1$=$R_2$=H, Z=NH, M=Na, n=16).

The reactive emulsifier of Example 5A is linear HEC12-C14 ($R_1$=$R_2$=H, Z=O, M=Na, $R_3$ is a linear alkyl radical $R_n$ where n=12–14).

The reactive emulsifier of Example 6A is unsaturated HEC16–C1B ($R_1$=$R_2$=H, Z=O, M=Na, $R_3$ is an unsaturated alkyl radical $R_n$ where n=16–18).

Comparative Example 7A

A chloroprene homopolymer latex is prepared as described in Example 1A, except that the reactive emulsifier HEC12 is replaced by disproportionated rosin Gresinox 511, used in the same molar amounts as the reactive emulsifiers of Examples 1A to 6A.

|  | Examples | | | | | | Comparative |
|---|---|---|---|---|---|---|---|
|  | 1A | 2A | 3A | 4A | 5A | 6A | 7A |
| HEC12 | 9.7[a] | — | — | — | — | — | — |
| HEC16[b] | — | 9.7[a] | — | — | — | — | — |
| HA12 | — | — | 9.7[a] | — | — | — | — |
| HA16 | — | — | — | 9.7[a] | — | — | — |
| Linear HEC12–C14 | — | — | — | — | 9.7[a] | — | — |
| Unsaturated HEC16–C18 | — | — | — | — | — | 9.7[a] | — |
| Disproportionated rosin[c] | — | — | — | — | — | — | 9.7[a] |
| Level of solid (%) | 37.5 | 44.6 | 40.6 | 35.4 | 35.6 | 37.2 | 38.7 |

[a]Amount, expressed in $10^{-3}$ mol, of surfactant per 100 g of chloroprene charged
[b]Sinnoester HMP, sold by Sidobre-Sinnova, of hemiester type, carrying a saturated linear hydrocarbonaceous chain with 16 carbons
[c]Gresinox 511, sold by DRT Examples 1A to 6A show that the use of only the reactive surfactants corresponding to the formula (I) makes it possible both to generate micelles and to carry out the polymerization under good conditions. The latices obtained are stable.

Examples 1B to 7B

Chloroprene homopolymer latices are prepared as described in Example 1A, except that the commercial reactive emulsifier Sinnoester HMP is used exclusively, both the polymerization temperature being varied (from 50° C. to 10° C.) and the polymerization pH being varied (from 6.2 to 12), through the nature of the pH buffer.

Comparative Examples 8B to 10B

Chloroprene homopolymer latices are prepared as described in Example 7A, except that the nature of the pH buffer and thus the polymerization pH is varied.

Examples 1B to 7B demonstrate the possibility of polymerizing chloroprene in the presence of a single reactive surfactant corresponding to the formula (I), within a temperature range of between 10° C. and 50° C., within a pH range varying from 6.2 to 12. Comparative Examples 8B to 10B show, for their part, that the use of rosin salts does not make possible the polymerization of chloroprene at weakly basic or acidic pH values.

Example 1C and Comparative Example 2C

Two chloroprene homopolymer latices are prepared as described in Example 1A, except that the degree of conversion of the monomer is equal to or greater than 97%. The latices are formed into films at 60° C. for 10 days. Test specimens are subsequently cut out from the films, weighed on a precision balance and immersed in demineralized water, at ambient temperature, for several days. Monitoring the increase in the mass of the test specimens over time gives the water uptake of the films, calculated as follows: Water uptake (t)=[mass (t)–initial mass]/initial mass*100

|  | Examples 1C | Comparative 2C |
|---|---|---|
| HEC16[a] | 9.7 | — |
| Disproportionated rosin[b] | — | 9.7 |
| Final level of solid (%) | 50 |  |
| Final pH | 11.6 | 51 |
| Water uptake after 1 day (%) | 1.9 | 7.4 |
| Water uptake after 2 days (%) | 2.9 | 11 |
| Water uptake after 3 days (%) | 3.7 | 13.7 |
| Water uptake after 4 days (%) | 4.3 | 16 |
| Water uptake after 17 days (%) | 10.1 | 40.8 |
| Water uptake after 29 days (%) | 15 | 60.6 |

[a]Sinnoester HMP, sold by Sidobre-Sinova, amount, expressed in $10^{-3}$ mol, of surfactant per 100 g of chloroprene charged
[b]Gresinox 511, sold by DRT, amount, expressed in $10^{-3}$ mol, of surfactant per 100 g of chloroprene charged

|  | Examples | | | | | | | Comparative | | |
|---|---|---|---|---|---|---|---|---|---|---|
|  | 1B | 2B | 3B | 4B | 5B | 6B | 7B | 8B | 9B | 10B |
| HEC16[a] | 9.7 | 9.7 | 9.7 | 9.7 | 9.7 | 9.7 | 9.7 | — | — | — |
| Disproportionated rosin[b] | — | — | — | — | — | — | — | 9.7 | 9.7 | 9.7 |
| T (° C.) | 50 | 30 | 10 | 50 | 30 | 10 | 50 | 50 | 50 | 50 |
| Initial pH | 12 | 12 | 12 | 8 | 8 | 8 | 6.2 | 12 | 8 | 6 |
| Level of solid (%) | 48 | 47.9 | 50.7 | 46.1 | 50.3 | 50.7 | 50.7 | 51.1 | — | — |
| Final diameter of the particles (nm) | 115 | 122 | 172 | 103 | 110 | 127 | 250 | 140 | — | — |
| Reaction time (h) | 8 | 5.75 | 6.2 | 6.75 | 4.25 | 4 | 5 | 12 | — | — |
| Feasibility | Polymerizations can be carried out | | | | | | | | Reaction impossible | |

[a]Sinnoester HMP, sold by Sidobre-Sinova, amount, expressed in $10^{-3}$ mol, of surfactant per 100 g of chloroprene charged
[b]Gresinox 511, sold by DRT, amount, expressed in $10^{-3}$ mol, of surfactant per 100 g of chloroprene charged

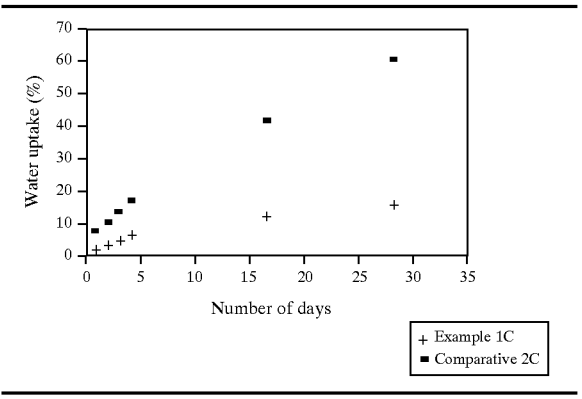

+ Example 1C
■ Comparative 2C

Example 1C and Comparative Example 2C show that the use of a reactive surfactant corresponding to the claimed formula (I) makes it possible to reduce the water uptake of the latice films by a factor of 4.

Example 1D

A chloroprene homopolymer latex is prepared according to the procedure described in Example 1A, except that the pH buffer used is sodium hydrogencarbonate and the reactive surfactant is a commercial C16 hemiester (Sinnoester HMP). The method used for the determination of the distribution of the reactive surfactant between the surface of the particles and the aqueous phase consists in carrying out conductimetric titrations. This technique makes it possible to titrate the carboxyl functional groups present at the surface of the polymer particles of a latex or else in the aqueous phase. The titration consists of a back titration: an excess of sodium hydroxide is added to the sample to be titrated, so as to ionize all the carboxyl functional groups present, and then titration of the strong acid functional groups and then of the weak acid functional groups is subsequently carried out with hydrochloric acid. These titrations were carried out after various treatments of or washing operations on the latex.

| Example 1D[a] | |
|---|---|
| Titration after washing operations over ion-exchange resins[b] | 69% of the HEC16 at the surface of the latex particles |
| Replacement of serum by ultrafiltration 10 times[c] and titration of the latex | 76% of the HEC16 at the surface of the particles |
| Replacement of serum by ultrafiltration 10 times[c] and titration of the serum | 22% of the HEC16 in the aqueous phase |
| Centrifuging and titration of the aqueous phase[d] | 5% of the HEC16 in the aqueous phase |

[a]Amount of HEC16, expressed as percentage relative to the total amount initially charged; conductimetric titration carried out with $10^{-2}$N sodium hydroxide and with $10^{-2}$N hydrochloric acid
[b]Dilution of the latex to a level of solid of 2%, successive treatments with an equimolar mixture of anionic and cationic ion-exchange resins Dowex MR-3 (Aldrich), until constant values of conductivity are obtained
[c]Dilution of the latex to a level of solid of 2% and replacement of the serum 10 times by tangential filtration over Millipore cellulose plates with a cutoff threshold of 5 nm
[d]Centrifuging the crude latex for 3 h at 20000 revolutions/min and then for 40 min at 5000 revolutions/min over a Millipore filter with a cutoff threshold of 100 nm: recovery of the unprecipitated aqueous phase and then titration Example 1D demonstrates the presence, after washing operations on the latex according to 2 different techniques, of close to 70% of the initial amount of reactive surfactant charged at the surface of the particles. At the same time, titration of the aqueous phase confirms these results, with less than 25% of the free reactive surfactant in aqueous phase. These results give support to the hypothesis of very slight embedding of the reactive surfactant charged.

Example 1E

A chloroprene homopolymer latex is obtained by emulsion polymerization, at 12° C. and under a nitrogen atmosphere, of 100 parts by mass of chloroprene, 0.23 part by mass of n-dodecyl mercaptan, 3 parts by mass of reactive emulsifier HEC16, 2.3 parts by mass of sodium hydrogencarbonate, 2 parts by mass of nonionic surfactant NP30 (nonylphenol carrying 30 ethylene oxide units, sold by BASF), 0.4 part by mass of sodium dithionite and 92.3 parts by mass of deaerated soft water. Polymerization is initiated by continuous delivery, at a constant rate, of a 4% solution of sodium persulphate in water. Polymerization is halted at a conversion of greater than or equal to 90% by addition of 0.05 part by mass of phenothiazine.

Comparative Example 2E

A chloroprene and methacrylic acid copolymer latex is obtained by emulsion polymerization, at 10° C. and under a nitrogen atmosphere, of 98 parts by mass of chloroprene, 2 parts by mass of methacrylic acid, 0.1 part by mass of n-dodecyl mercaptan, 2.5 parts by mass of Emulsogen EP (linear C12–C18 alkyl sulphonated surfactant, sold by Hoechst), 1.5 parts by mass of Triton X100 (octylphenoxypolyethoxyethanol, sold by Union Carbide), 72 parts by mass of deaerated soft water and 0.14 part by mass of sodium dithionite. Polymerization is initiated by continuous delivery, at a constant rate, of a 2% solution of sodium persulphate in water. Polymerization is halted at a conversion of greater than or equal to 90% by addition of 0.05 part by mass of phenothiazine.

The latices with the synthesis presented in Examples 1E and 2E are diluted to a level of solid of 2% and then washed 4 times over an equimolar mixture of anionic and cationic ion-exchange resins Dowex MR-3, until stable values of conductivity are obtained. The surface carboxylic charges are subsequently conductimetrically titrated according to the method described in Example 1D. This analysis gives a percentage of carboxylic charges contributed either by the surfactant (Example 1E) or by the methacrylic comonomer (Example 2E) and which is found at the surface of the polymer particles, after a series of washing operations over resins.

| | Examples 1E | Comparative 2E |
|---|---|---|
| % of carboxyl functional groups at the surface of the polymer particles after 4 washing operations over resins[a] | 55% of the HEC16 at the surface of the latex particles | 25% of the methacrylic acid at the surface of the latex particles |

[a]Amount of carboxylic charges, expressed as percentage relative to the total amount initially charged; conductimetric titration carried out with $10^{-2}$N sodium hydroxide and with $10^{-2}$N hydrochloric acid Example 1E and Comparative Example 2E show that the use of a reactive surfactant corresponding to the formula (I) makes it possible to improve the surface functionalization by carboxylic charges, contrary to the use of methacrylic acid under batch conditions, for which the results obtained allow a high degree of embedding to be suspected.

Example 1F

A chloroprene homopolymer latex is obtained by emulsion polymerization, at 10° C. and under a nitrogen atmosphere, of 100 parts by mass of chloroprene, 0.1 part by mass of n-dodecyl mercaptan, 3.5 parts by mass of disproportionated rosin Gresinox 511 (sold by DRT), 0.88 part by mass of potassium hydroxide, 1.5 parts by mass of Triton X100 (octylphenoxypolyethoxyethanol, sold by Union Carbide), 72 parts by mass of deaerated soft water and 0.14 part by mass of sodium dithionite. Polymerization is initiated by continuous delivery, at a constant rates of a 2% solution of sodium persulphate in water. Polymerization is halted at a conversion of greater than or equal to 90% by addition of 0.05 part by mass of phenothiazine.

Examples 2F and 3F

Two chloroprene homopolymer latices are prepared as described in Example 1E, except that the reactive surfactant HEC16 is, in one of the cases, replaced by its unreactive homologue, that is to say devoid of double bond and prepared under the same conditions but in the presence of succinic anhydride and not maleic anhydride (HES16, Example 2F; HEC16, Example 3F).

Example 4F

A chloroprene homopolymer latex is prepared as described in Comparative Example 2E.

The half-crystallization time is determined, by means of a Shore hardness test, for all the latices for which the synthesis is presented in Examples 1F to 4F. For this, the latices are precipitated from ethanol and gathered into a thick film, and the change in their hardness over time is monitored by a Shore test. The half-crystallization time corresponds to the achievement of 50% of the difference in hardness observed between time zero and the final time.

| Examples | 1F | 2F | 3F | 4F |
|---|---|---|---|---|
| Carboxylic agent employed | Disproportionated rosin | HES16 | HEC16 | Methacrylic acid |
| Half-crystallization time (hours) | 5 | 4.7 | 7.3 | 13.9 |

It is known that the copolymerization of chloroprene results in the introduction of defects into the chains, the consequence of which is a reduction in the crystalline properties of the polymer.

Examples 1F, 2F and 4F show the harmful influence of the batchwise copolymerization of methacrylic acid on the rate of crystallization of the material. Example 3F, for its part, demonstrates a much less marked influence of HEC16, which can be attributed to a slow incorporation within the polymer chain. This example consequently shows that it is possible to functionalize polychloroprene by carboxyl functional groups without, however, detrimentally affecting, to a large extent, its crystalline properties and therefore its adhesive properties, which is not the case with a conventional batchwise copolymerization with methacrylic acid.

What is claimed is:

1. Process for the polymerization of chloroprene or of a mixture of chloroprene and of up to 20% by weight of a copolymerizable monomer, in aqueous emulsion in the presence of radical initiators, at a temperature of between 5° C. and 70° C., characterized in that the polymerization is carried out in the presence of one or more copolymerizable surfactants in agreement with the formula described below (I)

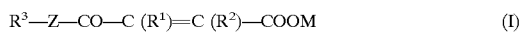

$$R^3\text{—}Z\text{—}CO\text{—}C(R^1)\text{=}C(R^2)\text{—}COOM \qquad (I)$$

where:
   $R^3$ is a saturated or unsaturated, linear or branched and aliphatic or aromatic $C_n$ hydrocarbonaceous chain with n from 10 to 20;
   $R^1$ and $R^2$, which are identical or different, are chosen from H or a $C_1$-$C_3$ alkyl radical;
   Z is —O—;
   M is an alkali metal or $NH_4$.

2. Process according to claim 1, characterized in that $R^3$ is chosen from $C_{12}$ to $C_{18}$ alkyl radicals.

3. Process according to claim 1, characterized in that $R^1$=$R^2$=H.

4. Process according to claim 1, characterized in that M is chosen from Na and K.

5. Process according to claim 1, characterized in that $R^3$ is a saturated linear $C_{16}$ alkyl radical, $R^1$=$R^2$=H[[, Z=O]] and M=Na.

6. Process according to claim 1, characterized in that the reaction is carried out at a pH of 5 to 13.

7. Process according to claim 6, characterized in that the reaction is carried out at a pH of 6 to 8.

8. Process according to claim 1, characterized in that the copolymerizable surfactant of formula (I) is present in an amount of 2 millimol to 50 millimol per 100 grams of chloroprene or of the mixture of chloroprene and of the copolymerizable monomers.

9. Process according to claim 7, characterized in that the copolymerizable surfactant of formula (I) is present in an amount of 5 millimol to 20 millimol per 100 grams of chloroprene or of the mixture of chloroprene and of the copolymerizable monomers.

10. Chloroprene homopolymer latex prepared according to the process of claim 1, characterized in that—the carboxyl functional groups present at the surface of the polymer particles of the latex are between 3 meq/100 grams and 30 meq/100 grams of polymer.

11. Chloroprene homopolymer latex according to claim 10, characterized in that the carboxyl functional groups present at the surface are between 5 meq/100 grams and 15 meq/100 grams of polymer.

* * * * *